United States Patent [19]

Shotmeyer

[11] 3,885,588
[45] May 27, 1975

[54] DEVICE FOR REMOVING WATER FROM THE BOTTOM OF UNDERGROUND LIQUID FUEL TANKS

[76] Inventor: Albert Shotmeyer, 46 Westerly Rd., Saddle River, N.J. 07506

[22] Filed: Sept. 12, 1973

[21] Appl. No.: 396,576

[52] U.S. Cl. ............... 137/565; 137/172; 137/590
[51] Int. Cl. ............................................. B67d 5/60
[58] Field of Search ........... 137/172, 565, 577, 578, 137/584, 588, 590, 140, 572, 576; 222/189, 383, 464, 564; 73/299, 302; 417/40

[56] References Cited
UNITED STATES PATENTS

| | | | |
|---|---|---|---|
| 673,546 | 5/1901 | Nye | 137/140 |
| 1,556,732 | 10/1925 | Sterrick | 137/140 |
| 1,771,519 | 7/1930 | Allen | 23/267 A |
| 1,855,388 | 4/1932 | DuBois | 137/576 |
| 2,087,368 | 7/1937 | Wilson et al. | 206/219 |
| 3,088,634 | 5/1963 | Rosekrans et al. | 222/564 |
| 3,211,349 | 10/1965 | Prussin et al. | 222/464 |
| 3,381,709 | 5/1968 | Pregno | 137/578 |
| 3,447,880 | 1/1972 | MacCabe | 137/578 |
| 3,631,880 | 1/1972 | Hansel | 137/172 |
| 3,636,976 | 1/1972 | Hansel | 137/590 |
| 3,783,888 | 1/1974 | Johnson | 137/140 |
| 3,785,537 | 1/1974 | Appleby et al | 222/464 |

*Primary Examiner*—Martin P. Schwadron
*Assistant Examiner*—George L. Walton
*Attorney, Agent, or Firm*—Harry N. Schofer

[57] ABSTRACT

Water that settles below the liquid fuel in an underground tank is removed by a perforated plastic container disposed at the bottom of the tank. This container is deposited in an existing tank through a hole to be formed in the wall of a vent pipe, the water being removed by a suction pump connected to the container by a flexible tubular conduit. The container may be made from a material that sinks to the bottom of the tank, or particulate matter may be passed through the flexible conduit into the container to cause the latter to sink to the bottom of the tank.

5 Claims, 5 Drawing Figures

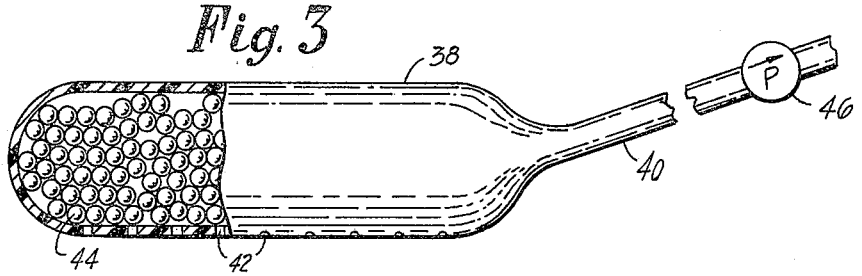
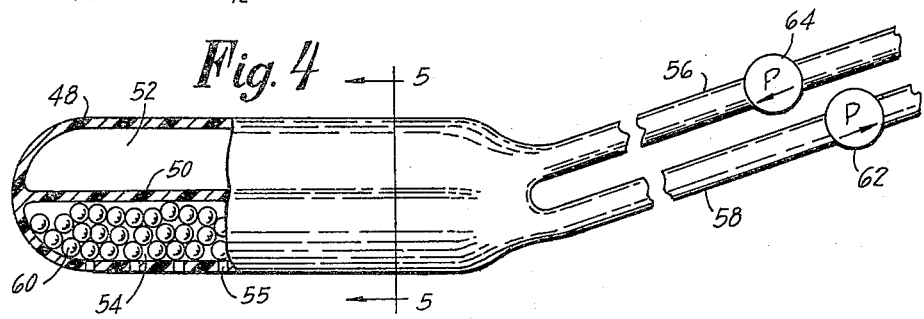
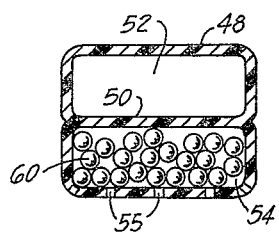
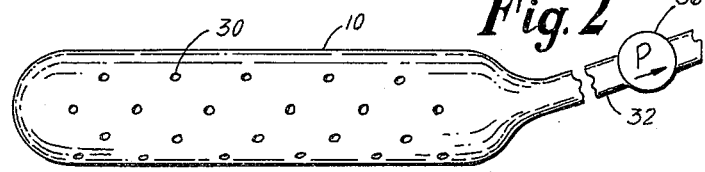
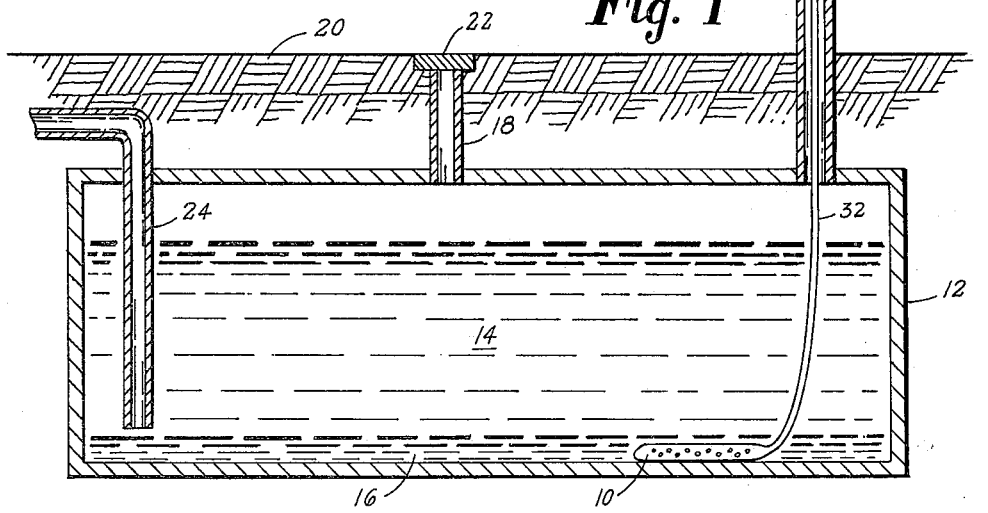

DEVICE FOR REMOVING WATER FROM THE BOTTOM OF UNDERGROUND LIQUID FUEL TANKS

BACKGROUND OF THE INVENTION

1. Field of the Invention

This invention relates to a liquid removal device, and more particularly to a device for removing water that collects at the bottom of a liquid fuel containing underground tank.

Water collecting at the bottom of underground liquid fuel containing tanks has plagued automobile service stations for a long time. This water enters the tank by leakage through improperly fitted filling caps and from moisture carried by the air entering the tank when the filling cap is removed or through the vent pipe. The moisture in this air condenses in the cool atmosphere within the tank, and the water, being heavier than the petroleum fuel within the tank, sinks to the bottom. Unless this collected water is removed, it will be pumped out with the liquid fuel and delivered to the fuel tanks of automotive vehicles.

2. Description of the Prior Art

In order to meet this situation, the suction or dispensing pipe for withdrawal of liquid fuel is usually disposed approximately 3 inches above the bottom of the tank. It is obvious, therefore, that when the level of the water rises to a point near the entrance to the dispensing pipe, there is a danger that water will be withdrawn with the liquid fuel through the dispensing pipe.

It has also been proposed to provide a water lock valve on the suction or dispensing pipe which floats on the surface of the water and closes the end of the suction pipe when the level of the water reaches that point.

Both of the above proposals are inadequate to prevent the discharge of some water from the fuel being dispensed from the tank, because the very act of liquid fuel withdrawal causes an agitation of the water and fuel surrounding the inlet end of the suction pipe, resulting in the withdrawal of water with the liquid fuel in spite of these preventive means.

It is evident, therefore, that the only satisfactory remedy lies in the periodic removal of collected water before it rises to objectionable levels.

Various devices have been proposed to remove collected water, including the lowering of a tube through the fuel fill pipe, or by drilling a separate hole in the top of the tank through which a pipe can be lowered to the bottom of the tank. Both of these devices are objectionable. It is undesirable and time consuming to remove the fill cap any more than necessary, as more moisture laden air and/or water is admitted into the tank when the fill cap is open. The drilling of a separate hole in the top of the tank, especially in the case of an existing fuel tank containing fuel, requires the excavation through the overlying paving and earth, and the drilling or cutting a hole through the top of the tank carries with it the hazard of creation of sparks and an explosion of the fuel within the tank.

SUMMARY OF THE INVENTION

It is an object of this invention to provide a novel device for removing water from the bottom of underground liquid fuel containing tanks which overcomes the above undesirable features of the prior art.

It is a further object to provide a novel device for removing water from the bottom of existing underground liquid fuel containing tanks which does not involve the fill pipe or filling cap, nor requires the cutting into the fuel tank.

It is a still further object to provide a novel device of the character under consideration which is economical to manufacture, easy to install, and efficient in operation.

The attainment of the above and additional objects and advantages is accomplished by a novel construction consisting of a thin flexible walled container of a plastic or rubber material which does not chemically react with the fuel or water within the fuel tank. As used herein, the term "flexible walled container" has reference to a thin walled container made from a plastic or rubber material, the walls of which are readily deformable by a slight pressure. This container is generally flat and elongated in shape. In one modification, the container is made from a material heavier than water, so it will sink to the bottom of the liquid fuel and water within the tank. The container is perforated throughout, and a tubular conduit is attached to one end. A hole is cut in the side wall of the fuel tank's vent pipe, and the container is passed through the hole and forced down the vent pipe by pushing on the tubular conduit, or by means of a blast of air directed into the vent pipe. The container will sink to the bottom, leaving a portion of the tubular conduit extending through the hole, to which a suction pump may be attached. The suction pump may be of the well known squeeze type, having inlet and outlet valves.

In a second form of the invention, the container may have perforations in the bottom wall and/or in the lower part of the side walls. In any form of the invention, if the container is made from a material that is not heavier than water, the empty container is inserted through a hole in the vent pipe, as described above, and particulate matter, such as shots or pebbles, is passed through the tubular conduit and into the container, to sink the latter to the bottom of the liquid fuel containing tank. The particulate matter may be added even if the specific gravity of the material is greater than that of the water to assure that the device will not be disturbed by currents created by the act of dispensing fuel from the tank. Obviously, the perforations in the container must be smaller than the particulate matter, and the particulate matter must be smaller than the tubular conduit to pass therethrough. The particulate matter must be of a type that will not chemically react with the water or liquid fuel within the tank.

In a third form of the invention, an imperforated partition divides the container into a watertight chamber and a perforated chamber. The perforations in the perforated chamber are in a wall remote from the partition. A separate tubular conduit connects with each chamber and extends through the opening in the wall of the vent pipe. The container is inserted into the tank through the hole in the vent pipe in the same manner as described above. When so inserted, air is pumped or blown into the airtight chamber, and particulate matter is delivered into the perforated chamber to sink the container in an upright position with the watertight chamber on top of the perforated chamber. When so sunk, the airtight chamber may be deflated, having served its primary purpose, or if desired, the watertight chamber may be kept inflated to assure that the container will remain upright despite any turbulence within the tank, caused by filling or dispensing fuel from the tank.

BRIEF DESCRIPTION OF THE DRAWING

A clearer understanding of the invention and its operation will become apparent from the following detailed description in conjunction with the annexed drawings, in which:

FIG. 1 is a diagrammatic illustration of a first embodiment of the invention disposed within a liquid fuel tank;

FIG. 2 is an enlarged illustration of the water removing device shown in FIG. 1;

FIG. 3 is an elevation view, partly in section, of a second embodiment of the invention;

FIG. 4 is an elevation view, partly in section, of a third embodiment of the invention; and FIG. 5 is a sectional view of the third embodiment, taken on the line 5—5 of FIG. 4.

Referring to FIGS. 1 and 2, illustrating a first embodiment of the invention, the device comprises an elongated container 10 made from a plastic material having a specific gravity greater than that of water, so it will sink to the bottom of a liquid fuel tank 12 containing liquid petroleum fuel 14 at the bottom of which a small quantity of water 16 has collected.

The tank 12 is of the conventional type, having a fill pipe 18 extending from a hole in the top of the tank to a point just below the surface of the ground or paving 20, with a removable cap 22, the upper surface of which is flush with the earth or paving, which cap can be removed to permit filling of the tank.

The tank 12 includes a dispensing pipe 24 the inlet of which is disposed a few inches from the bottom of the tank to reduce the possibility of entraining water along with the fuel. The tank also includes a vent pipe 26 to permit the venting of fuel vapors to discharge at an elevation well above the surrounding buildings. The upper end of the vent pipe is capped by a protective cap 28 spaced slightly above the upper end of the vent pipe, to prevent the entry of water and dust into the vent pipe.

The vent pipe 26 is usually about 2 inches in internal diameter, and may extend directly above the tank 12 as shown, or may have a pair of bends therein to attach the upstanding end of the pipe to a building or other support.

In tanks of this type, the collection of water in the bottom of the tank cannot be avoided. This water may enter through the fill pipe 18 when the cap is removed for filling and/or measuring the contents by inserting a stick, especially in rainy weather, or from surrounding pools of water and/or ice and snow. Furthermore, a driving rain or snow will force rain or snow down the vent pipe and into the tank in spite of the protective cap 28. As the volume of the fuel within the tank is decreased by dispensing, moisture laden air is drawn into the tank through the vent pipe, and the water condenses in the cool atmosphere within the tank. This collected water, being heavier than the liquid fuel, sinks to the bottom. Eventually this water reaches undesirable levels, and unless removed, may be drawn into the dispensing pipe 24 along with the fuel and into the tanks of automobiles.

The container 10 is made from a plastic material that is heavier than water so it will sink to the bottom of the tank as shown in FIG. 1. The container 10 may have perforations throughout its walls, as shown, or may have them only in the bottom wall, or in the bottom wall and in the lower part of the side walls.

A tubular conduit 32 connects at one end with one end of the container 10, the other end of the conduit extending up into the lower end of the vent pipe 26 and through a hole 34 formed in a wall of the vent pipe disposed a short distance above the ground level. The outer end of the tubular conduit 32 is attached to a suction means 36, which may be an exhaust pump, preferably of the squeeze type having a pair of check valves, which can be manually squeezed to pump the water from the lower part of the tank.

The hole 34 in the vent pipe 26 may be formed in any well known manner, as by sawing, drilling, grinding, or by means of a blow torch. As each of these methods involves the creation of sparks within the vent pipe which may be filled with fuel vapor, the following method of forming the hole is suggested:

As a preliminary step, a small deflated balloon having a tubular flexible pipe connected therewith is lowered into the vent pipe from the top end thereof, having first removed the cap 28. This balloon is lowered to a position below that point where it is desired to form the hole, and then inflated, forming a block in the pipe between the point where the hole is to be made and the fuel tank. A second tube is lowered into the vent pipe through the upper end, and a blast of air or inert gas, such as nitrogen, is used to purge the vent pipe of all combustible vapors. The hole may then be formed, making sure that the flexible pipe which is connected with the balloon is not cut during the hole forming operation. Obviously, if a blow torch is to be used, the flexible pipe connected with the balloon must be able to resist the heat from the torch. After the hole is formed, the balloon is deflated, moved to a position above the hole, and again inflated.

The vent pipe usually has an internal diameter of about 2 inches, and the hole formed therein can have a diameter of about 1½ inches. The container 10 is passed into the hole thus formed and forced down by applying pressure to a connecting tubular conduit 32. If this doesn't work, a blast of compressed air is applied to the vent pipe above the inserted container 10, which will force it into the tank, allowing plenty of slack in the tubular conduit 32 for the container to sink to the bottom of the tank. The balloon is then deflated, removed from the vent pipe, and the protective cap 28 is replaced. A suction means 36 is then connected with the outer end of the tubular conduit 32 and operated to remove the collected water from the tank. Any well known means can be used to cover the hole 34, for example, masking tape.

A second preferred embodiment is illustrated in FIG. 3, and includes a flexible container 38 made from a plastic material or rubber. A tubular conduit 40 is connected with one end of the container and, similarly to all of the embodiments, passes upwardly through the vent pipe and the hole in the wall thereof, having a suction means 46 connected with the outer end thereof.

The lower wall of the container 38 has a plurality of perforations 44 therein. These perforations may, if desired, be continued to the lower part of the side walls of the container, or throughout the walls of the container as in the embodiment of FIG. 1.

In this form of the invention the container 38 can be made from a plastic material having a specific gravity greater or less than that of the liquid in which it is immersed, and to make sure that it sinks to the bottom thereof, it may be filled or partially filled with a particulate matter 44, in the form of shots or pebbles, or any material that is heavier than the water, is insoluble therein, and which will not chemically react with the liquids within the tank or with the plastic container. The particulate matter 44 is larger than the perforations 42 so that they will not escape from the container, and are smaller than the internal diameter of the tubular conduit 40 so they can be passed into the container through the outer end of the tubular conduit after the container has been installed within the tank in the manner described above. This embodiment has the advantage that the container will not be affected by any currents created within the tank by the filling or dispensing of liquid from the tank.

A third embodiment of the invention is illustrated in FIGS. 4 and 5, in which the container is designated by the numeral 48 and includes a transverse partition 50 dividing the interior of the container into an upper airtight chamber 52 and a lower perforated chamber 54, the bottom of the chamber 54 having a plurality of perforations 55. Obviously, the perforations can be continued into the side walls or in the lower part of the side walls of the chamber 54. A first tubular conduit 56 is connected at one end with the airtight chamber 52, and a second tubular conduit 58 is connected at one of its ends with the lower or perforated chamber 54, the other ends of the two tubular conduits extending upwardly through the vent pipe and hole in the wall thereof as in the description of FIGS. 1 and 2. The interior of the perforated chamber 54 is filled or partially filled with particulate matter 60 in the form of shots or pebbles for example, having a size larger than that of the perforations 55 and smaller than the internal cross section of the tubular conduit 58.

The outer end of the tubular conduit 56 is attached to a pressure pump 64, and the outer end of the tubular conduit 58 is attached to a suction means 62, which may be any well known pumping means, such as a squeeze type pump.

The container 48 is installed within the tank 12 in the same manner as above described in connection with the embodiment of FIGS. 1 and 2, the airtight chamber 52 being deflated and the perforated chamber 54 being empty. When in position within the tank, a small quantity of air is delivered through the tubular conduit 56 into the airtight chamber 52 to inflate the chamber, causing the container 48 to float on the surface of the liquid within the tank. The container is then sunk to the bottom of the tank by passing particulate matter through the tubular conduit 58 into the perforated chamber 54. This operation assures that the container 48 will be sunk with the perforated chamber 54 below the airtight chamber 52 in a position in which the water can be withdrawn through the perforations 55. The weight of the particulate matter 60 will stabilize the container within the tank and prevent shifting thereof by currents and eddies caused by the addition of fuel into or by the withdrawal of fuel from the tank. The upper airtight chamber 52 may then be deflated, or if desired, be maintained in an inflated state.

Having removed the suction means 62 before the installation procedure described above, this unit may then be attached to the outer end of the tubular conduit 58. The air pressure pump 64, having served its purpose, may be removed and the outer end of the tubular conduit 56 closed off in any desired manner, or if preferred, the pump 64 may be left attached.

I claim:

1. A device for removing the water from the bottom of an underground liquid fuel containing tank having a body of water below the fuel therein, comprising: a collapsible flexible hollow container having at least one perforation through a wall thereof, a flexible tubular conduit connected at one end with said container and communicating with the interior thereof; and a suction means connected with the other end of said tubular conduit;

means within said container having a specific gravity greater than that of the fuel and water within the tank, said means within said container comprising particulate matter having a minimum cross section greater than that of the perforation in said container wall and less than that of the tubular conduit, said particulate matter comprising a material that is insoluble in any liquid fuel or water within a fuel tank in which it is to be immersed.

2. A device for removing the water from the bottom of an underground liquid fuel containing tank as defined in claim 1, in which said container includes an imperforated upper wall.

3. A device for removing the water from the bottom of an underground liquid fuel containing tank as defined in claim 2, in which said container includes a transverse partition wall forming with said imperforated upper wall of the container an airtight chamber, and forming with said perforated bottom wall a perforated chamber, said tubular conduit being connected with said perforated chamber and said particulate matter being disposed within said perforated chamber, and a second tubular conduit connected at one end with said airtight chamber.

4. A device for removing the water from the bottom of an underground liquid fuel containing tank as defined in claim 3, in which the perforations in said perforated chamber are in a wall opposite to said transverse partition wall.

5. A device for removing the water from the bottom of an underground liquid fuel containing tank as defined in claim 3, in which said suction means is an air pump.

* * * * *